Patented Dec. 15, 1953

2,662,875

UNITED STATES PATENT OFFICE 2,662,875

TERPOLYMERS OF ACRYLONITRILE AND ALLYL AMINES

David W. Chaney, Nether Providence Township, Delaware County, Pa., assignor to The Chemstrand Corporation, Decatur, Ala., a corporation of Delaware No Drawing. Application February 20, 1952,
Serial No. 272,718

8 Claims. (Cl. 260—80.5)

This invention relates to a new class of inherently dye-receptive polymeric materials.

This application is a continuation-in-part of my copending application Serial No. 170,710, filed June 27, 1950.

The new polymeric materials are terpolymers or ternary copolymers of acrylonitrile with allylamines of the formula

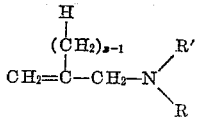

where $x$ is an integer from 1 to 3, and R and R' each represents an alkyl radical, e. g., a methyl, ethyl, propyl, or butyl radical, an aryl radical, e. g., a phenyl, naphthyl, tolyl, or xylyl radical, or an aralkyl radical, e. g., a benzyl or ethylphenyl radical, and R and R' may be the same or different, or the two R's taken together represent the divalent residue of a heterocyclic secondary amine, or with the nitrogen oxides or quaternary ammonium salts of the allylamines.

Illustrative allylamines which may be copolymerized with acrylonitrile to produce the new terpolymers of the invention are N,N-dimethyl-allylamine, N,N-diethyl-allylamine, N,N-dipropyl-allylamine, N,N-di-isopropyl-allylamine, N,-N-dibutyl-allylamine, N,N-di-isobutyl-allylamine, N,N-diphenyl-allylamine, N,N-di-mono-methyl-anilino-allylamine, N-allylmorpholine, N-allylpiperidine, N-allyl-ethyleneimine, N-allylpyrrolidine, N,N-dimethyl-methallylamine, N,N-diethyl-methallylamine, N,N-dimethyl-ethallylamine, N,N-diethyl-ethallylamine, N-methallylmorpholine, etc.

The invention also embraces new terpolymers of acrylonitrile and allylamines containing quaternary ammonium groups obtainable by copolymerizing acrylonitrile with an allylamine which has been reacted with a quaternizing agent prior to the copolymerization, or by treating a terpolymer comprising acrylonitrile and the selected allylamine with a suitable quaternizing agent, in solution or in the form of a shaped article. Suitable quaternizing agents are the alkyl iodides, chlorides, and bromides, the arylsulfonates such as benzenesulfonate, p-toluene-sulfonate, and methyltoluene-sulfonate, the alkyl sulfates, such as methylsulfate, ethyl sulfate, n-propylsulfate, n-butylsulfate, etc.

The invention includes ternary copolymers containing at least 80% of acrylonitrile, at least 1% of the allylamine, or quaternary salt, and at least 1% of a polymerizable mono-olefinic monomer which is copolymerizable with the acrylonitrile and allylamine, such as, for example, vinyl acetate, vinyl chloride, methacrylonitrile, styrene, acrylic acid, the acrylates, methacrylates, maleic anhydride, etc. Preferred ternary copolymers contain from 80 to 98% of acrylonitrile, from 1 to 19% of the allylamine, and from 1 to 19% of the third monomer.

The new ternary copolymers may be synthesized from mixtures of the monomers by any of the known polymerization procedures including solution polymerization, mass or bulk polymerization, and polymerization in aqueous suspension or emulsion, in the presence of a dispersing or emulsifying agent, the suspension or emulsion being maintained by any agitation method, for example by tumbling in a rotating reactor, or through the use of any suitable rotary stirring device. A wide variety of emulsifying agents may be used. In general, any composition having both hydrophilic and hydrophobic radicals may be used and the expression "emulsifying agent" is intended to include commercial soaps made by the saponification of animal and vegetable oils, such as sodium stearate, potassium laurate, ammonium oleate, and mixtures of these and other salts as they occur in commercially available soaps. Other emulsifying agents are the rosin soaps, the salts of sulfonated hydrocarbons, dialkyl sodium sulfosuccinates, the salts of partial esters of sulfuric acid and high molecular weight alcohols, quaternary ammonium salts such as stearyl dimethyl benzyl ammonium chloride, non-ionic emulsifiers such as ethylene oxide condensates of hexitan monostearates.

The polymerization reaction may be catalyzed by means of any free radical-producing catalyst. Suitable catalysts include the water-soluble peroxy compounds, for example, hydrogen peroxide, sodium peroxide, sodium perborate, sodium persulfate and other alkali metal salts of peroxy acids, or other water-soluble peroxy compounds. Azo catalysts, such as azo-2,2'-diisobutyronitrile may be used advantageously in the polymerization. A wide variation in concentration of catalysts may be used depending on the temperature of polymerization, the concentration of monomers in the reaction mass, and the molecular weight desired for the terpolymer. From 0.1 to five percent by weight of catalyst may be used. In general, it is desirable to have a uniform reaction rate and therefore a substantially uniform concentration of the catalyst is desired throughout the reaction. An approximation of these conditions may be obtained by separately preparing an aqueous solution of the catalyst and adding the solution in increments to the polymerizing mass periodically throughout the reaction.

The ternary copolymers of the invention may also be produced by redox polymerization in which the polymerization is conducted at low temperature in the presence of the peroxy type catalyst and a reducing agent which forms a reduction-oxidation system ("redox" system) with the peroxy compounds which accelerate the polymerization.

The new ternary copolymers can be produced, also, by a special solution polymerization procedure in which the solvent is saturated with a calculated mixture of the monomers, the catalyst, or a portion thereof is added, and the polymerization is conducted just at reflux temperature in the resulting single phase liquid system by continuously adding a mixture of the monomers, in a predetermined proportion, to the solution at such a rate as to keep the reflux temperature substantially constant. In this manner, the desired uniform concentration of each monomer is maintained in the reactor and the products are substantially homogeneous with respect to both composition and molecular weight. The catalyst solution may be added continuously at a controlled rate to the polymerizing solution to maintain the catalyst concentration constant during the reaction.

In another method of producing the terpolymers, all of the allylamine to be copolymerized is dissolved in the solvent, preferably in water, and the acrylonitrile and other copolymerizable monomer is added continuously to the polymerizing mixture.

In any of the above systems, the polymerization may be conducted in the presence of molecular weight regulators which act as chain terminators and prevent the formation of very large molecular weight increments. Such regulators are exemplified in the high molecular weight aliphatic mercaptans, such as dodecyl mercaptan and dithioglycidol, and by carbon tetrachloride.

While the ternary copolymers containing at least 80% acrylonitrile in the molecule are fiber-forming and therefore represent a preferred embodiment of the invention, the ternary copolymers containing lesser amounts, down to 50% acrylonitrile are also useful. They may be used, for example, in coating compositions, or in blends with a fiber-forming acrylonitrile polymer which is not dye-receptive, to impart dye-receptivity thereto.

In general, the ternary copolymers are soluble in the known solvents for high acrylonitrile polymers. However, in some instances such solvents act as plasticizers for the terpolymers affording a composition which can be molded into articles of various shapes and sizes. Examples of solvents which may be used to prepare spinning and casting solutions of the new terpolymers which are soluble therein to produce solutions of from 5 to 30% concentration are N,N-dimethylacetamide, N,N-dimethylformamide, sulfolane, mixtures of nitromethane and formamide, and mixtures of nitromethane and water. Solutions of the soluble terpolymers containing at least 80% of acrylonitrile can be formed into synthetic fibers by extrusion into an evaporative medium or into a non-solvent for the polymer.

The evaporative medium used in dry-spinning filaments or yarns from solutions of the terpolymers may comprise any gaseous or vapor-containing medium which is inert to the terpolymer, such as air, nitrogen, steam, etc., or any mixture of such inert media.

The non-solvent which may be used in wet-spinning or wet-casting the solution of the ternary copolymer may be a mixture of water and the spinning solvent, glycerin, isopropanol, a mixture of predominantly aromatic hydrocarbons, such as that available commercially under the trade designation Solvesso-100, or any appropriate liquid which is an extractive for the spinning or casting solvent and a non-solvent for the ternary copolymer.

Instead of fibers or films, the new terpolymers comprising acrylonitrile and the allylamine, or quaternary salt may be formed into other shaped articles, such as rods, tubes, sheets, casings, etc.

Except where the polymerization is conducted in solution at reflux temperature, it may be effected by heating the monomers to 30 to 100° C. in the presence of the catalyst, and may be performed at alkaline or acid pH.

A pH of from 2 to 5 is preferred, and is maintained by the addition to the polymerization mass of an acid or of a salt which liberates an acid under the polymerization conditions.

Further details of the practice of the invention are set forth in the following examples, in which the parts are given by weight.

*Example I*

To 2900 parts of water there were added 45 parts of N,N-dimethylallylamine, 15 parts of vinyl acetate, and 240 parts of acrylonitrile. The solution was titrated to a pH of 4 by the addition of 1:1 aqueous sulfuric acid, and heated to reflux (71° C.). A solution of 12 parts of potassium persulfate in 100 parts of water was added, and the temperature was allowed to rise to 73° C. A mixture of 7.5 parts of vinyl acetate and 142.5 parts of acrylonitrile was then added continuously over a period of 35 minutes at a controlled rate to maintain the temperature at 73° C. for one hour. 345 parts of a ternary copolymer having a specific viscosity of 0.210 at 0.1 gm. concentration in 100 ccs. of dimethylformamide was obtained. It contained 11 percent of N,N-dimethylallylamine, by nitrogen analysis.

*Example II*

A 17 percent solution of the ternary copolymer of Example I was spun into isopropanol at 45° C. through a spinneret having 44 holes each 4 mils. in diameter. The fibers were withdrawn from the bath, stretched 125 percent between godets, washed, dried, and stretched 300 percent at 160° C. The fibers had a tenacity of 4.0 gms./denier; extensibility of 7.2 percent. They were stabilized by relaxation in boiling water in which they shrank about 10 percent. These fibers were dyed to a good deep shade in a dye-bath prepared by dissolving 15 percent of 96 percent sulfuric acid, and 2 percent of the acid wool dye Wool Fast Scarlet G Supra (percentages on the weight of the material to be dyed), in water. The articles were entered into the bath at 55° C., and the bath was brought to the boil in 10 minutes, and boiled for 60 minutes, after which the articles were removed from the bath, rinsed, and dried.

*Example III*

Fifteen parts of N,N-dimethylallylamine, 85 parts of acrylonitrile, and 0.5 part of methylmethacrylate were dissolved in 950 parts of water. The solution was titrated to pH 4 with sulfuric acid and heated to reflux (73° C.). A solution of 4.0 parts of potassium persulfate in 50 parts of water was added, after which a mixture of 3.0 parts of methylmethacrylate and 97 parts of acrylonitrile was added continuously over a period of 35 minutes at a rate controlled to maintain the temperature at 73° C. The solution became viscous during the addition of the acrylonitrile-methylmethacrylate mixture and after the addition had been continued for 25 minutes, 200 parts of water were added, to dilute the solution and facilitate stirring. As soon as the addition had been completed the terpolymer was separated by filtration, washed and dried. 94 parts of a terpolymer having a specific viscosity of 0.23 at 0.1 gm. concentration in 100 ccs. of dimethylformamide were obtained. N: 24.73 percent; calculated dimethylallylamine content, 6.2 percent.

Films and fibers formed from an 18 percent dimethylacetamide solution of the terpolymer are dyed to a good red shade.

*Example IV*

Fifteen parts of N,N-dimethylallylamine, 5.0 parts of methylacrylate, and 80 parts of acrylonitrile were dissolved in 950 parts of water. The solution was adjusted to a pH of 4 with 1:1 hydrochloric acid, and heated to reflux (73° C.). A solution of 4 parts of potassium persulfate in 50 parts of water was added, and the solution was heated at 73° C. for two hours. 65 parts of a ternary copolymer having a specific viscosity of 0.20 at 0.1 gm. concentration in 100 ccs. of dimethylformamide were obtained. Films formed from a dimethylacetamide solution of the ternary polymer exhibited good dye acceptance when they were dyed in a bath and under the conditions of Example II.

This invention is defined by the appended claims.

I claim:

1. A terpolymer containing, by weight in the polymer molecule (a) at least 80% of acrylonitrile; (b) at least 1% of a substance selected from the group consisting of (1) allyl amines having the formula

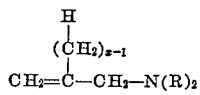

wherein $x$ is an integer from 1 to 3, and R is selected from the group consisting of alkyl, aryl, and aralkyl radicals, (2) allyl amines having the formula

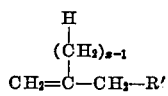

wherein $x$ has the same significance as above and R' represents a radical derived from a heterocyclic secondary amine, the nitrogen of which is directly bonded to the allyl radical, and (3) quaternary ammonium salts of the allylamines; and (c) at least 1% of a polymerizable mono-olefinic monomer other than acrylonitrile which is copolymerizable with (a) and (b).

2. A terpolymer as defined in claim 1 wherein the polymer molecule contains by weight 80 to 98% of (a), 1 to 19% of (b), and 1 to 19% of (c).

3. A terpolymer containing, by weight in the polymer molecule, at least 80% of acrylonitrile, at least 1% of vinyl acetate, and at least 1% of N,N-dimethylallylamine.

4. A terpolymer containing, by weight in the polymer molecule, at least 80% of acrylonitrile, at least 1% of methyl methacrylate, and at least 1% of N,N-dimethylallylamine.

5. A terpolymer containing, by weight in the polymer molecule, at least 80% of acrylonitrile, at least 1% of styrene, and at least 1% of N,N-dimethylallylamine.

6. A terpolymer containing, by weight in the polymer molecule, at least 80% of acrylonitrile, at least 1% of methyl acrylate, and at least 1% of N,N-dimethylallylamine.

7. A terpolymer containing, by weight in the polymer molecule, at least 80% of acrylonitrile, at least 1% of vinyl chloride, and at least 1% of N,N-dimethylallylamine.

8. A terpolymer containing, by weight in the polymer molecule (a) at least 50 percent of acrylonitrile; (b) at least 1 percent of a substance selected from the group consisting of (1) allyl amines having the formula

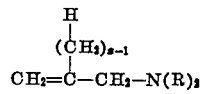

wherein $x$ is an integer from 1 to 3, and R is selected from the group consisting of alkyl, aryl, and aralkyl radicals, (2) allyl amines having the formula

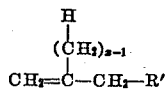

wherein $x$ has the same significance as above and R' represents a radical derived from a heterocyclic secondary amine, the nitrogen of which is directly bonded to the allyl radical and (3) quaternary ammonium salts of the allylamines; and (c) at least 1 percent of a polymerizable mono-olefinic monomer, other than acrylonitrile, which is copolymerizable with (a) and (b).

DAVID W. CHANEY.

References Cited in the file of this patent

UNITED STATES PATENTS

| Number | Name | Date |
|---|---|---|
| 2,172,822 | Tamele et al. | Sept. 12, 1939 |